United States Patent
Poplawski et al.

(10) Patent No.: US 10,423,142 B2
(45) Date of Patent: Sep. 24, 2019

(54) THERMOSTAT CONFIGURATION DUPLICATION SYSTEM

(71) Applicant: Braeburn Systems, LLC, Montgomery, IL (US)

(72) Inventors: Daniel S. Poplawski, Oswego, IL (US); Glenn A. Moore, Geneva, IL (US)

(73) Assignee: Braeburn Systems LLC, Montgomery, IL (US)

( * ) Notice: Subject to any disclaimer, the term of this patent is extended or adjusted under 35 U.S.C. 154(b) by 0 days.

(21) Appl. No.: 15/040,773

(22) Filed: Feb. 10, 2016

(65) Prior Publication Data

US 2018/0074471 A1    Mar. 15, 2018

Related U.S. Application Data

(60) Provisional application No. 62/114,123, filed on Feb. 10, 2015.

(51) Int. Cl.

| | | |
|---|---|---|
| G05B 21/00 | (2006.01) | |
| G01M 1/38 | (2006.01) | |
| G05B 13/00 | (2006.01) | |
| G05B 15/00 | (2006.01) | |
| G05D 23/00 | (2006.01) | |
| G05B 19/042 | (2006.01) | |
| F24F 11/62 | (2018.01) | |
| F24F 11/30 | (2018.01) | |
| G05D 23/19 | (2006.01) | |
| F24F 11/64 | (2018.01) | |

(Continued)

(52) U.S. Cl.
CPC .......... *G05B 19/0426* (2013.01); *F24F 11/30* (2018.01); *F24F 11/62* (2018.01); *G05D 23/1934* (2013.01); *F24F 11/52* (2018.01); *F24F 11/58* (2018.01); *F24F 11/64* (2018.01); *F24F 11/65* (2018.01); *G05B 2219/2614* (2013.01)

(58) Field of Classification Search
CPC .. G05B 13/02; G05B 19/0426; H04L 41/0803
USPC ........................................................ 700/278
See application file for complete search history.

(56) References Cited

U.S. PATENT DOCUMENTS

| | | | |
|---|---|---|---|
| 2,054,039 | A | 9/1936 | Persons |
| 2,060,636 | A | 11/1936 | Persons |

(Continued)

FOREIGN PATENT DOCUMENTS

| | | |
|---|---|---|
| JP | 58065977 | 4/1983 |
| JP | 2004218436 | 8/2004 |
| JP | 2006009596 | 1/2006 |

OTHER PUBLICATIONS

ComfortLink II XL950 Control, User Guide, Trane U.S. Inc., 2011.

(Continued)

*Primary Examiner* — Md Azad
(74) *Attorney, Agent, or Firm* — The Law Offices of Konrad Sherinian

(57) ABSTRACT

A thermostat configuration system includes a first thermostat having a processor, a transceiver, a storage area and a control button. The processor generates configuration data for the first thermostat and stores the configuration data in the storage area of the first thermostat. The processor then causes the configuration data to be transmitted to multiple target devices using the transmitter, including at least a second thermostat.

10 Claims, 5 Drawing Sheets

(51) Int. Cl.
  *F24F 11/65* (2018.01)
  *F24F 11/52* (2018.01)
  *F24F 11/58* (2018.01)

(56) References Cited

U.S. PATENT DOCUMENTS

| | | |
|---|---|---|
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,606,401 A | 8/1986 | Levine |
| 4,730,941 A | 3/1988 | Levine et al. |
| 4,733,719 A | 3/1988 | Levine |
| 4,838,346 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Burns |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolus et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |

(56) References Cited

U.S. PATENT DOCUMENTS

| | | |
|---|---|---|
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0245352 A1 | 12/2004 | Smith |
| 2004/0256472 A1 | 12/2004 | DeLuca |
| 2004/0260427 A1 | 12/2004 | Wimsatt |
| 2005/0033707 A1 | 2/2005 | Ehlers |
| 2005/0040247 A1* | 2/2005 | Pouchak ............ G05D 23/1905 236/44 C |
| 2005/0040248 A1 | 2/2005 | Wacker |
| 2005/0040249 A1 | 2/2005 | Wacker |
| 2005/0082836 A1 | 4/2005 | Lagerwey |
| 2005/0108620 A1 | 5/2005 | Allyn et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0013119 A1* | 1/2013 | Mansfield .......... G05D 23/1934 700/286 |
| 2013/0032414 A1 | 2/2013 | Yilmaz |
| 2013/0056989 A1 | 5/2013 | Sabhapathy |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0152631 A1* | 6/2014 | Moore .................. G09G 3/04 345/205 |
| 2014/0156087 A1* | 6/2014 | Amundson ............ G05B 15/02 700/278 |
| 2014/0163746 A1 | 6/2014 | Drew |
| 2014/0316581 A1 | 10/2014 | Fadell |
| 2014/0319233 A1 | 10/2014 | Novotny |
| 2015/0081568 A1 | 3/2015 | Land, III |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0062618 A1 | 3/2016 | Fagan |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |

OTHER PUBLICATIONS

Cardio IIe Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

Brae8urn Systems LLC, "Temperature Limiting Adjustments for heating and Cooling (1000 Series)", Mportant Installation Instructions.

* cited by examiner

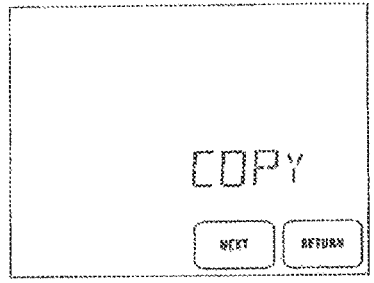
Fig. 4 — The user initiates the copying of the chosen settings from the source by pressing NEXT.
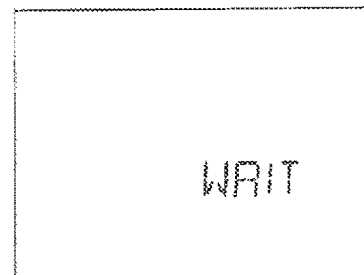
Fig. 5 — WAIT is displayed until the copy process is complete.
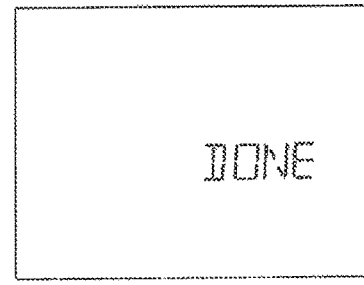
Fig. 6 — DONE is displayed for 1 second, after which the unit returns to the normal mode.
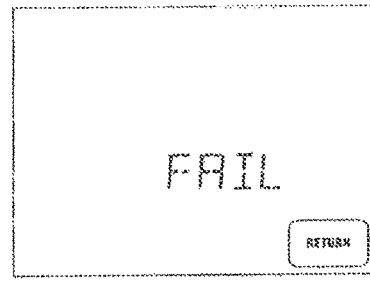
Fig. 7

THERMOSTAT CONFIGURATION DUPLICATION SYSTEM the present invention pertains to a system for thermostat configuration data being duplicated and transmitted from one device to another.

BACKGROUND

The adjustment and setting of thermostats and the programming that exists with such thermostats will determine how HVAC equipment is modulated and for what duration equipment should run. Many thermostats have complex and confusing controls and require a great deal of time to configure and program. In certain buildings with multiple units there are also multiple thermostats that require configuration and programming. If an installer must manually configure and program each thermostat over and over, accurate and efficient set-up of each thermostat may not occur. Also, individuals who receive a new thermostat may have difficulty navigating the complexities of thermostat settings. The present invention avoids such difficulties by allowing for the configuration and/or programming data of the thermostat to be quickly and accurately transferred from one device to another.

SUMMARY

The present invention provides for a system comprising a first thermostat having a processor, a transmitter, a storage area and a control button or touchpad. The processor generates and interprets configuration data for the thermostat and the storage area maintains the configuration data. A cloud storage provider may store and maintain a functionally equivalent copy of the thermostat configuration data as a virtual image. The transmitter may transmit configuration data to multiple target devices, including one or more thermostats or virtual images of the thermostats. The control button on the receiving thermostat may be activated in order to transmit configuration data to the receiving thermostat. The mobile device is capable of displaying the configuration data from the first thermostat and initiating or starting the transfer and confirming the success or failure or the transfer with diagnostic information.

In another embodiment, the control button is a touch pad provided by a display of the third thermostat in order to transmit the configuration data. In an embodiment, activating the control button of the third thermostat enables transmission of the configuration data to a third thermostat. In an embodiment, the second thermostat may be capable of transmitting the configuration data to a third thermostat. In an embodiment, the configuration data may be transmitted to a Wi-Fi router and the Wi-Fi router transmits the configuration data to the second thermostat.

BRIEF DESCRIPTION OF THE DRAWINGS

For a better understanding of the subject invention, reference may be had to embodiments shown in the attached drawings in which:

FIGS. 4-7 are screen shots of the present invention.

Figure 1:
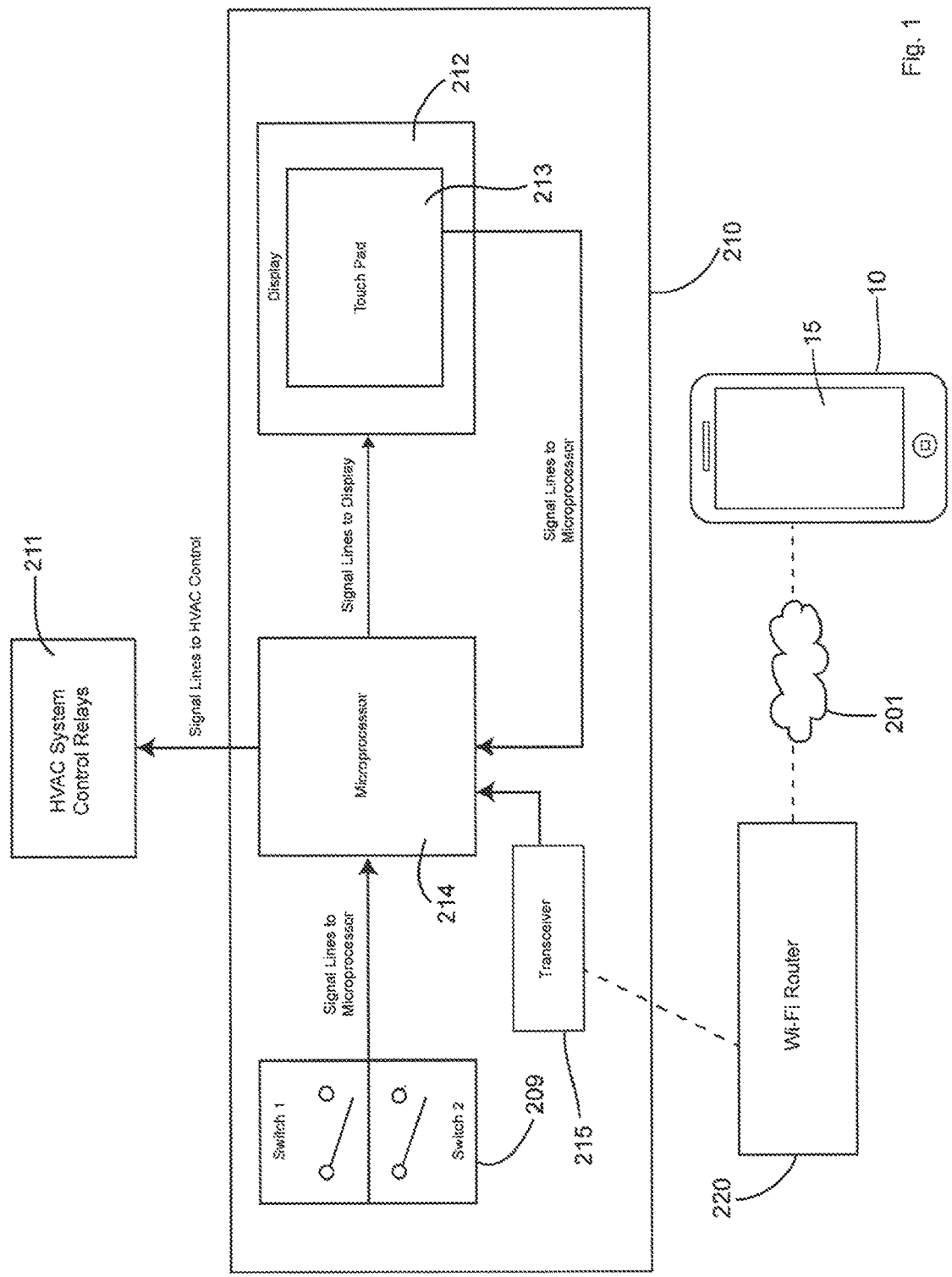
FIG. 1 is a diagrammatic view of the present invention.

Although the invention has been depicted with respect to the drawing FIGS. 1-8, various changes in form and detail may be made and understood by those of ordinary skill in the art.

DETAILED DESCRIPTION

The invention may be understood with respect to FIGS. 1-8. Turning to FIG. 1, the components of the system and the process of transmitting the configuration data will be described. The mobile device, such as a smartphone 10 includes a screen 15 to which the appropriate information can be displayed and input. The input may be via pad that is displayed on the touch screen display 15, or other means, such as a mouse, stylus or connected keyboard. The smart phone 10 includes telecommunications standard transmission means such as Bluetooth, 4G transmission or Wi-Fi transmission via the internet 201. The mobile device 10 transmits to a router 220 within a building where the targeted thermostat is located. The router communicates with a transceiver 215 located within the thermostat 200 via Wi-Fi, 900 Mhz, Bluetooth or similar wireless protocols. The thermostat includes on/off switches 209, its own display 212, a touchpad 213 and a microprocessor 214. The thermostat controls an HVAC system 211 or other heating or cooling system.

The microprocessor 214 of the thermostat is programmed to transmit configuration data regarding file operation of the thermostat 200 upon user input. The transmission of the configuration data is via transceiver 215 and router 220 to the internet 201. For example, a cloud server 201 may collect and organize all of the configuration data being transmitted from the thermostat 200. In this embodiment, the smartphone 10 and any other device that is linked to the desired cloud service provider, obtains the configuration data from the cloud server 201. In an alternate embodiment, the configuration data may be stored in a memory location within the thermostat or the router. A request for the data could be processed by the microprocessor 214 by sending the data directly to a requesting mobile device 10 or another thermostat (without use of a cloud server 201).

As can be understood, following the set-up, the user can be anywhere in the world and control the thermostat via the mobile device with communications being sent through the standard telephone network to the Cloud and the Cloud server 201 (FIG. 1), which can interact with the Wi-Fi network provided by the router 220 (FIG. 1) at the user's residence or commercial facility.

The router 220 communicates with the thermostat 210 via transceiver 215 that includes communication protocol for wireless transmission and receiver functions, such as IEEE 802.11. The transceiver communicates with the microprocessor 214 to control the systems connected to the thermostat, such as HVAC system control relays 211 that control a furnace or boiler, etc. In an embodiment the microprocessor 214 may be programmed to include wireless mesh communication as disclosed in U.S. Pat. Nos. 8,410,931 and/or 8,233,471 assigned to SIPCO. The total disclosure of such publications are each incorporated by reference herein.

It is noted that the thermostat 210 may include a touch pad display screen 212, however the operasion and set-up of the above invention does not require the user to input any commands or instructions via the thermostat display 212. All but one set-up step (413) can be accomplished via a remote input device 10 running the communication app and code input system that causes the microprocessor 214 to move to a listen mode when the set-up steps 400 to 420 are followed (FIG. 3), as discussed below.

In an alternate embodiment, a remote computer (wired or wireless) may be used to set-up or control the thermostat 210 via the internet and a browser by similar set-up screens depicted in FIGS. 4-7 displayed on a web page according to well know TCP/IP systems.

FIG. 1 is a schematic view including the links outside of the thermostat 210. The thermostat links with local router 220 and its Wi-Fi network that Sinks to the internet or first network. External devices such as cloud server 201, personal computer of repairman or other service providers, external database, the external user's remote input device, such as a wireless tablet or phone 10 and other wired users may communicate with the local router 220. The local router 220 can then communicate via Wi-Fi or other protocol such as a mesh network like Zigbee® on a second network with components including the thermostat 210 or other building environment control device that in turn can control HVAC equipment 211 including a furnace, heat pump, geothermal system, electric heat, air conditioning unit, humidifier, dehumidifier, air exchanger, air cleaner or air damper.

The thermostat 210 may receive input from wired or wireless sensors that can provide temperature, humidity and other environmental factors either within the budding or outside that may be used by the router to automatically issue commands to the thermostat based on the sensor input or building schedule information. The code input system of the present invention may also be operated via web-site on a computer 10 or other means and each of the components of the system may have a unique identifier, such as an IP or MAC address. The router 220 may have a local cache to store the IP addresses when each device is joined to the network. The second network may require a service set identifier (SSID) as an access parameter or a passcode.

Figure 2:
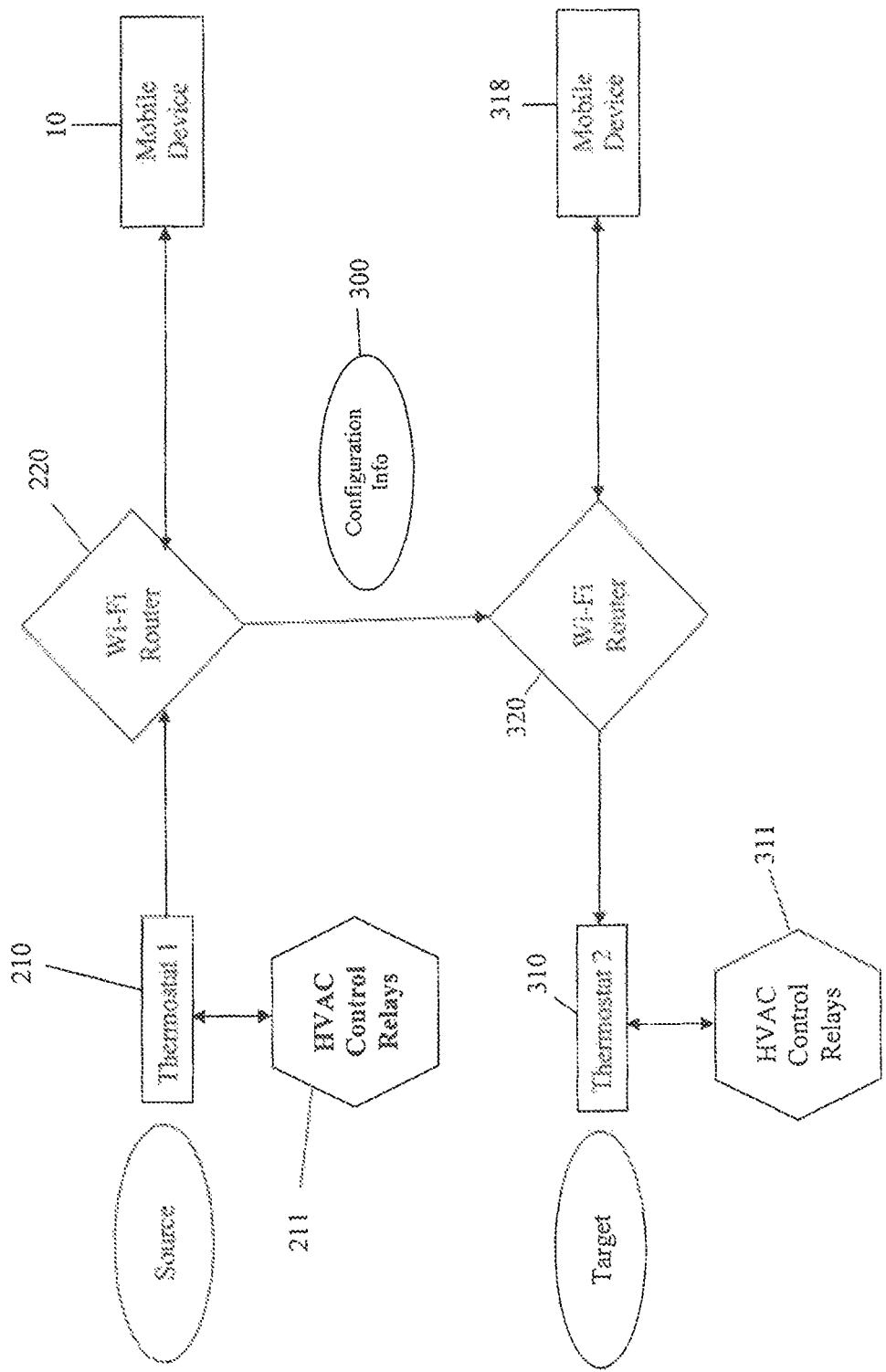
FIG. 2 is a schematic diagram of the present invention.

FIG. 2 depicts a schematic diagram providing an overview of the transmission of configuration data of the present invention. Overall, the invention pro vides for the transmission of configuration information 300 from a first thermostat 210 to a second thermostat 310. (The specific details of the steps to transmit the configuration data will be described below with respect to FIG. 3.) The first thermostat 210 is programmed in the ordinary course using an installer's previous knowledge, factory configuration, or an instruction manual to set the configuration data.

Configuration data may include mode and function settings of the thermostat, including temperature setting, time of day setting, day of week setting, programming set points, installer setting configuration, user settings, device identification, Wi-Fi router interlace data, Wi-Fi router identification data, mobile device identification data, sources of inputs for temperature, adjustments for relative humidity, discharge temperature, outdoor temperature, stages present, cooling response, lock-out, set point degrees, auxiliary stages, heat response, scheduling data, energy management settings, recover settings, uploader and downloader configuration settings and internet communication settings. Such configuration data may be programmed directly at the first thermostat 210 or remotely, such as by a mobile device 10, smart phone or tablet computer.

Once the first thermostat is configured, it will operate the HVAC control relays 211 in order to manage the environment of the building. In an embodiment, a button in application under the control of mobile device 10 is activated in order to transmit the configuration data 300 to Wi-Fi router 220. According to previous programming, the Wi-Fi router 220 will transmit the configuration data either to mobile device 10 or to Wi-Fi router 320, or both. The configuration data 300 is then transmitted to the second thermostat 310.

Depending on the configuration and geographic location of the thermostats and router, router 220 and 320 may be a single device. When installed of a wider area, the connection between router 220 and 320 may be through an internet or other service provider.

In an embodiment, the second thermostat 310 may be located in an apartment or condominium adjacent the first thermostat in the same building. In such an example, there may be as many as ten to hundreds of thermostats in a single building/complex. In such an environment, the first thermostat may transmit its configuration data 300 to each of the other thermostats in the building as discussed above with respect to the second thermostat 310. As shown in FIG. 2, the first thermostat 210 is the source for the configuration data 300 and the second thermostat 310 is the target.

However, in an alternate embodiment the second thermostat 310 may become the source and a third thermostat may become the target. In such an example, the second thermostat 310 will transmit the configuration data 300 to the third thermostat (not shown). Mobile devices 10, 318 may be used to supplement the operation as described in this system and may be used to alter the configuration data or configuration settings of any of the thermostats 210, 310. It is understood that once the target thermostats receive the configuration data they are then capable of controlling the environment via the HVAC control relays 311 that are connected to such target thermostat 310.

Figure 3:
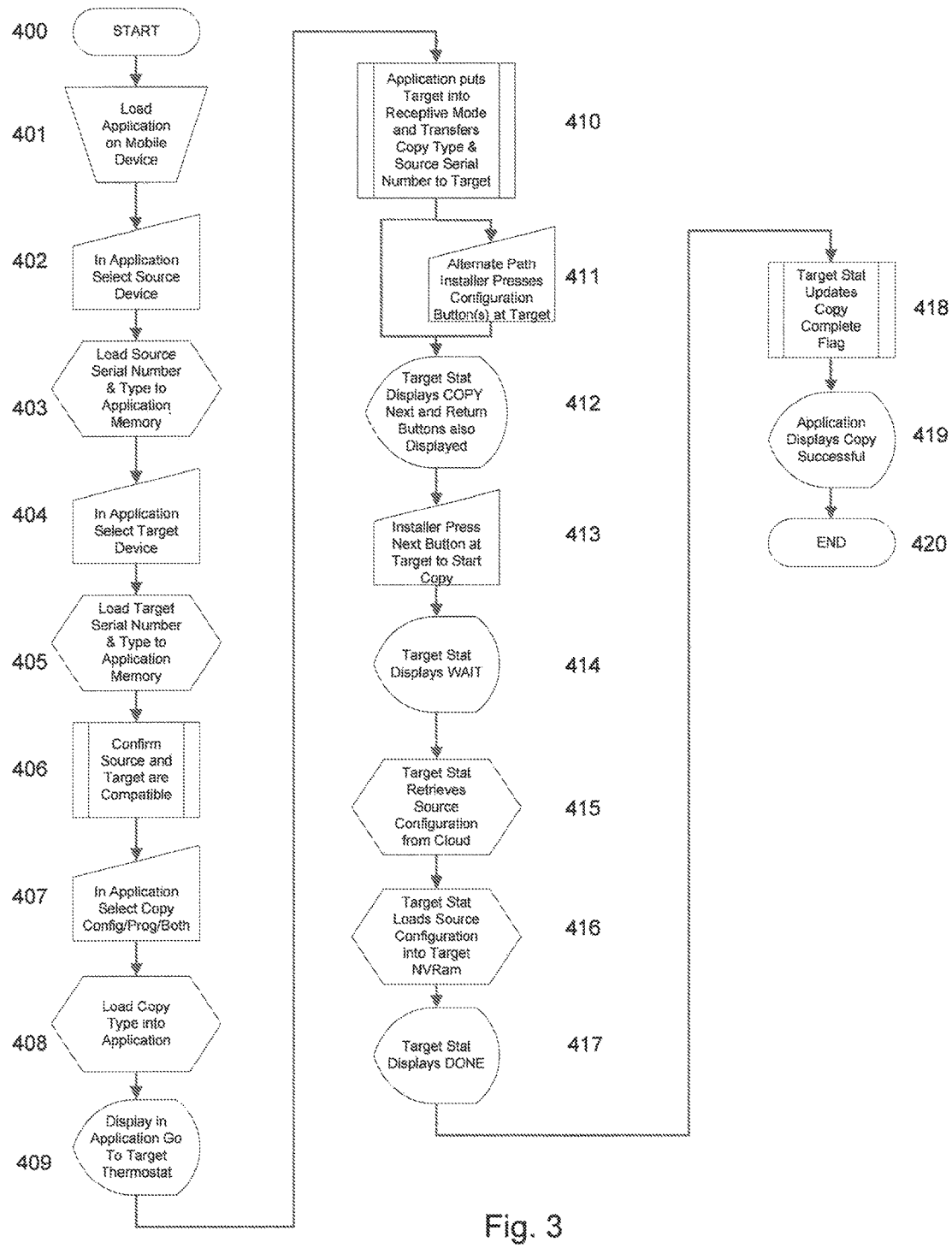
FIG. 3 is a flow diagram of the present invention.

Turning to FIG. 3, the detailed steps of the process will be described (also while referring to FIGS. 4-7). The process begins at step 400 and at first step 401 the application is loaded on the mobile device 10 or 318 and a cloud connection is established to communicate with the cloud based virtual thermostat images, and physical source and target devices. At the second step 402, the application will select the source device; such as the first thermostat 210. At the third step 403 the serial number and type is loaded to the application memory. At the fourth step 404, the target device is selected in the application. At the fifth step 405, the serial number and type is loaded into the target application memory; such as first thermostat 210.

At the sixth step 406, the target and source are confirmed as being compatible. At the seventh step 407, a copy of the configuration programming is selected in the application. At the eighth step 408, a copy of the type is loaded into the application. At the ninth step 409, a message "Go To Target Thermostat" is displayed by the application. At the tenth step 410, the application puts the target into receptive mode and transfers the copy type and source serial number to the target. For example, the target may be the second thermostat 310.

At eleventh step 411, the installer may choose an alternate path by pressing the configuration button at the target 310. At the twelfth step 412, the target thermostat 310 displays the word "Copy" as shown in FIG. 4. The twelfth step may also include the "Next" and "Return" buttons also being displayed. The thirteenth step 413, has the installer pressing the "Next" button at the target to start copying. At the fourteenth step 414, the target thermostat displays a "Wait" alphanumeric display as shown in FIG. 5. At step fifteen 415, the target thermostat retrieves the source configuration from the cloud, or via Wi-Fi router 320. At the sixteenth step 416, the target thermostat 310 loads the source configuration into the target thermostat non-volatile memory or another storage location. At the seventeenth step 417, the target thermostat 310 displays the alphanumeric symbol for "DONE" as depicted in FIG. 6. In the event that the configuration data fails to load to the target device, the display would provide a "FAIL" message (FIG. 7) and appropriate diagnostic codes.

At the eighteenth step 418, the target thermostat 310 updates the copy and provides a "Complete" flag in the processor. At the nineteenth step 419, the application displays a message that the copy has been successful as the last step 420 in this systems process. Thus, it is to be understood that a virtual copy of the configuration data may also be stored in the cloud and retrieved by the router 320 via the mobile devices 10, 318 and transmitted to any number of target thermostats.

Figure 8:
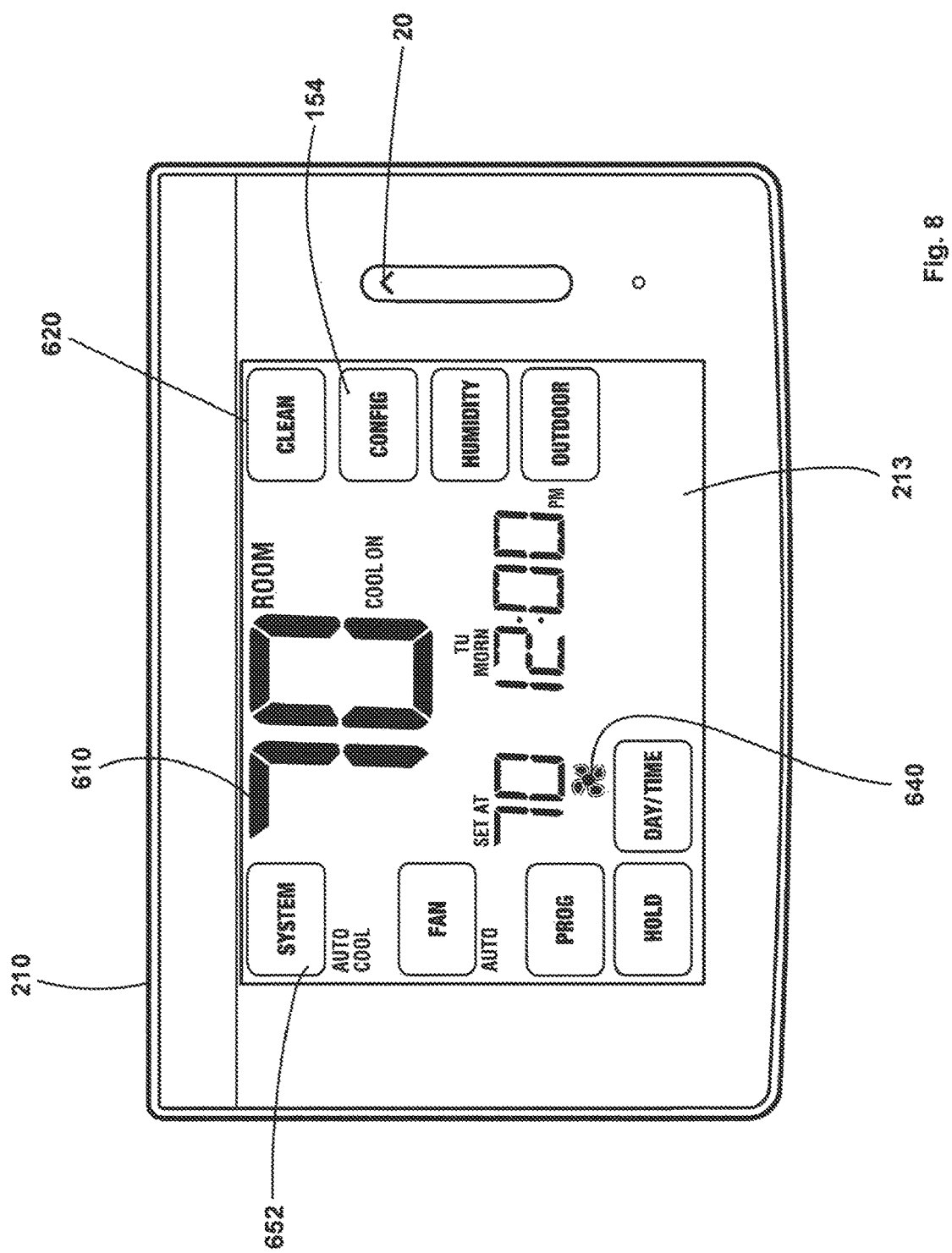
FIG. 8 is a plan view of a thermostat of the present invention.

FIG. 8 depicts a thermostat 200 of the present invention including a control button such as configuration touch pad 154 or hard or mechanical button 20. The control button(s) may be used to accept the configuration data from another device as discussed above. Other features of the thermostat include Temperature icon 610, alternative touch pads 620, 652 for functions such as CLEAN, HUMIDITY, OUTDOOR, SYSTEM, FAN PROG, HOLD DAY/TIME and FAN icon 640.

While various concepts have been described in detail, it would be appreciated by those skilled in the art that various modifications and alternatives to those concepts could be developed in light of the overall teachings of the disclosure. Therefore, a person skilled in the art, applying ordinary skill, will be able to practice the invention set forth in the claims without undue experimentation. It will additionally be appreciated that the particular concepts exposed herein are meant to be illustrative only and not limiting to the scope of the invention, which is to be given the full breath of the appended claims and any equivalents thereof.

What is claimed:

1. A thermostat configuration system comprising:
   (a) a first thermostat having a first processor, a first transceiver connected to the first processor, a first storage area and a first control button, the first storage area storing configuration data of the first thermostat, the first thermostat adapted to connect to a cloud server and a mobile device via the first transceiver and a first wireless router, the mobile device adapted to run an application;
   (b) a second thermostat having a second processor, a second transceiver connected to the second processor, a second storage area and a second control button, the second storage area adapted to store the configuration data, the second thermostat adapted to connect to the cloud server and the mobile device via the second transceiver and a second wireless router;
   (c) the first thermostat adapted to transmit the configuration data to the mobile device via the first transceiver and the first wireless router;
   (d) the application running on the mobile device adapted to:
      1) select the first thermostat as a first source device;
      2) select the second thermostat as a first target device;
      3) put the first target device into a receptive mode; and
      4) after the second control button of the first target device is pressed, transmit the configuration data to the first target device, wherein the configuration data is stored in the second storage area of the first target device.

2. The system of claim 1 wherein the first wireless router and the second routers are different Wi-Fi routers.

3. The system of claim 1 wherein the first wireless router and the second routers are a same Wi-Fi router.

4. The system of claim 1 further comprising a third thermostat having a third processor, a third transceiver connected to the third processor, a third storage area and a third control button, the third storage area adapted to store the configuration data, the third thermostat adapted to connect to the cloud server and the mobile device via the third transceiver and a third wireless router, wherein the mobile device is adapted to:
   1) select the second thermostat or the first thermostat as a second source device;
   2) select the third thermostat as a second target device;
   3) put the third thermostat device into a receptive mode; and
   4) transmit the configuration data, received from the second thermostat, to the second target device.

5. The system of claim 1 wherein the first control button and the second control button are displayed on the first thermostat and the second thermostat respectively.

6. The system of claim 1 wherein the second thermostat is adapted to determines if the configuration data is successfully transferred to the second thermostat.

7. The system of claim 1 wherein the second thermostat is adapted to display messages indicating whether the configuration data is successfully or unsuccessfully transferred to the second thermostat on a display of the second thermostat.

8. A method of transferring thermostat configuration data from one thermostat to one or more other thermostats via the cloud comprising the steps of:
   an application running on a mobile device;
   the application selecting a first thermostat as a source device;
   the application selecting a second thermostat as a target device;
   the application determining that the first thermostat and the second thermostat are compatible based on a first serial number and a first type of the source thermostat, and a second serial number and a second type of the target thermostat;
   the source device transmitting configuration data of the source device to the mobile device;
   the mobile device putting the target thermostat into a receptive mode;
   the mobile device transmitting the configuration data to the target thermostat;
   the target thermostat receiving the configuration data; and
   the target thermostat storing the configuration data into a storage of the target thermostat.

9. The method of claim 8 further comprising the steps of:
   the target thermostat displaying a control button; and
   the target thermostat initiating receipt of the configuration data from the mobile device after the control button is pressed.

10. The method of claim 8 further comprising the step of displaying the result of transmitting the configuration data on a display of the target thermostat.

* * * * *